US012772114B2

(12) United States Patent
Yang et al.

(10) Patent No.: US 12,772,114 B2
(45) Date of Patent: Oct. 20, 2026

(54) METHOD FOR COMMUNICATION CONTROL, COMMUNICATION DEVICE, AND STORAGE MEDIUM

(71) Applicant: Beijing X-Ring Technology Co., Ltd., Beijing (CN)

(72) Inventors: Jiang Yang, Shanghai (CN); Lijun Huang, Shanghai (CN); Xu Zou, Shanghai (CN)

(73) Assignee: Beijing X-Ring Technology Co., Ltd., Beijing (CN)

( * ) Notice: Subject to any disclaimer, the term of this patent is extended or adjusted under 35 U.S.C. 154(b) by 349 days.

(21) Appl. No.: 18/430,560

(22) Filed: Feb. 1, 2024

(65) Prior Publication Data

US 2025/0016625 A1 Jan. 9, 2025

(30) Foreign Application Priority Data

Jul. 6, 2023 (CN) ......................... 202310828348.9

(51) Int. Cl.
*H04W 28/20* (2009.01)
*H04L 5/00* (2006.01)

(52) U.S. Cl.
CPC ........... *H04W 28/20* (2013.01); *H04L 5/0046* (2013.01)

(58) Field of Classification Search
CPC ............................. H04W 28/20; H04L 5/0046
See application file for complete search history.

(56) References Cited

FOREIGN PATENT DOCUMENTS

| | | | | |
|---|---|---|---|---|
| WO | WO 2021155677 | * | 8/2021 | ............. H04W 8/24 |
| WO | WO 2021155677 A1 | | 8/2021 | |
| WO | WO 2022111718 A1 | | 6/2022 | |

OTHER PUBLICATIONS

European Patent Application No. 24155501.0 Search Report dated Jun. 14, 2024, 8 pages.

* cited by examiner

*Primary Examiner* — Ronald B Abelson
(74) *Attorney, Agent, or Firm* — Cozen O'Connor

(57) ABSTRACT

A method for communication control includes: determining a first number of radio frequency (RF) channels requested by a first communication card and a second number of RF channels requested by a second communication card; in a first preset situation, determining a third number of RF channels and a fourth number of RF channels based on the first number of RF channels and the second number of RF channels; and reporting a first capability and a second capability to a first network device and a second network device, respectively, in which, the first capability indicates that a number of RF channels supported by the first communication card is the third number of RF channels, and the second capability indicates that a number of RF channels supported by the second communication card is the fourth number of RF channels.

17 Claims, 3 Drawing Sheets

METHOD FOR COMMUNICATION CONTROL, COMMUNICATION DEVICE, AND STORAGE MEDIUM

CROSS REFERENCE TO RELATED APPLICATION

This application is based on and claims priority to Chinese patent application No. 202310828348.9, filed on Jul. 6, 2023, the entire content of which is hereby incorporated into this application by reference.

TECHNICAL FIELD

The present disclosure relates to a field of mobile communication systems, especially to a method for communication control, a communication device, and a storage medium.

BACKGROUND

A terminal configured with two communication cards, such as a subscriber identity module (SIM) or a universal subscriber identity module (USIM), is becoming more popular with the ongoing development of mobile communication technologies. The two communication cards configured on the terminal generally share one set of terminal hardware resources, to multiplex a maximum capability of a single card. Due to a limitation of a maximum number of radio frequency (RF) channels, even if there are two or more RF paths where the terminal may communicate with networks associated with the two communication cards simultaneously, RF channel resources between different communication cards still need to be coordinated.

SUMMARY

A method for communication control is provided in a first aspect of embodiments of the disclosure, and the method includes: determining a first number of radio frequency (RF) channels requested by a first communication card and a second number of RF channels requested by a second communication card; in a first preset situation, determining a third number of RF channels and a fourth number of RF channels based on the first number of RF channels and the second number of RF channels, in which a sum of the third number of RF channels and the fourth number of RF channels is less than or equal to a maximum number of RF channels supported by a terminal, in which the first preset situation comprises: a sum of the first number of RF channels and the second number of RF channels being greater than the maximum number of the RF channels supported by the terminal, and the first communication card or the second communication card being not in a first service state; and reporting a first capability and a second capability to a first network device and a second network device, respectively, in which the first capability indicates that a number of RF channels supported by the first communication card is the third number of RF channels, and the second capability indicates that a number of RF channels supported by the second communication card is the fourth number of RF channels.

According to a second aspect of embodiments of the disclosure, a communication device is provided, and includes: a transceiver, a memory, and a processor respectively connected to the transceiver and the memory. The processor is configured to: determine a first number of radio frequency (RF) channels requested by a first communication card and a second number of RF channels requested by a second communication card; in a first preset situation, determine a third number of RF channels and a fourth number of RF channels based on the first number of RF channels and the second number of RF channels, in which a sum of the third number of RF channels and the fourth number of RF channels is less than or equal to a maximum number of RF channels supported by a terminal, in which the first preset situation comprises: a sum of the first number of RF channels and the second number of RF channels being greater than the maximum number of the RF channels supported by the terminal, and the first communication card or the second communication card being not in a first service state; and report a first capability and a second capability to a first network device and a second network device, respectively, in which the first capability indicates that a number of RF channels supported by the first communication card is the third number of RF channels, and the second capability indicates that a number of RF channels supported by the second communication card is the fourth number of RF channels.

According to a third aspect of embodiments of the disclosure, a computer-readable storage medium storing computer executable instructions is provided. The computer executable instructions are caused to implement a method when executed by a processor. The method includes: determining a first number of radio frequency (RF) channels requested by a first communication card and a second number of RF channels requested by a second communication card; in a first preset situation, determining a third number of RF channels and a fourth number of RF channels based on the first number of RF channels and the second number of RF channels, in which a sum of the third number of RF channels and the fourth number of RF channels is less than or equal to a maximum number of RF channels supported by a terminal, in which the first preset situation comprises: a sum of the first number of RF channels and the second number of RF channels being greater than the maximum number of the RF channels supported by the terminal, and the first communication card or the second communication card being not in a first service state; and reporting a first capability and a second capability to a first network device and a second network device, respectively, in which the first capability indicates that a number of RF channels supported by the first communication card is the third number of RF channels, and the second capability indicates that a number of RF channels supported by the second communication card is the fourth number of RF channels.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification, and do not constitute an incorrect limitation of the present disclosure.

DETAILED DESCRIPTION

Figure 1:
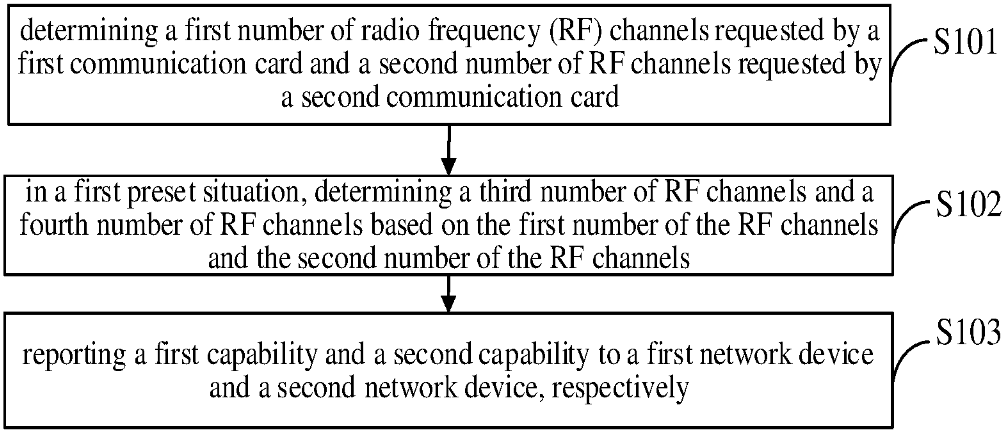
FIG. 1 is a flowchart illustrating a method for communication control according to embodiments of the present disclosure.

Embodiments of the disclosure will be described and examples of embodiments are illustrated in the drawings. The same or similar elements and the elements having the same or similar functions are denoted by like reference numerals throughout the descriptions. Embodiments described herein with reference to drawings are explanatory, serve to explain the disclosure, and are not construed to limit embodiments of the disclosure.

A dual-card dual-standby dual-pass scenario means that one terminal is configured with two communication cards, the two communication cards may be standby simultaneously, and the terminal may connect network signals from the two communication cards simultaneously. In the related art, in the dual-card dual-standby dual-pass scenario, due to a limitation of a maximum number of radio frequency (RF) channels, RF channel resources need to be coordinated between the two communication cards. Assuming that the maximum number of RF channels is N, and the two communication cards include a first communication card and a second communication card, when the first communication card and the second communication card are inserted into the terminal, capability indication information reported by the terminal indicates that: the first communication card has a capability of supporting M transmitting RF channels, and the second communication card has a capability of supporting (N-M) transmitting RF channels. Therefore, the network device may configure, based on capability indication information, the M transmitting RF channels in the N transmitting RF channels to the first communication card, and the remaining transmitting RF channels to the second communication card, and the first communication card and the second communication card can transmit uplink data via corresponding RF channels, to achieve a dual-card dual-standby dual-pass purpose.

However, in the related art, although it may ensure to achieve the dual-card dual-standby dual-pass purpose in a dual-card scenario, dual-card RF resource allocation is not flexible enough, and in an actual application scenario, the RF channel resources cannot be fully utilized to improve the user experiences.

In order to solve the problem in the related art, a method for communication control provided in the disclosure may dynamically adjust a radio frequency (RF) channel resource of each communication card based on real-time service RF channel requirements of two communication cards on the premise of ensuring that a number of RF channels used by two cards does not exceed a limitation of a maximum number of RF channels, which may fully utilize RF channel resources, to improve dual-card dual-standby dual-pass service performances and the user experiences.

FIG. 1 is a flowchart illustrating a method for communication control according to embodiments of the present disclosure. As illustrated in FIG. 1, the method for communication control includes steps 101 to 103.

At step 101, a first number of radio frequency (RF) channels requested by a first communication card and a second number of RF channels requested by a second communication card are determined.

In embodiments of the disclosure, the method is applicable to a chip, a terminal, etc. The terminal mainly includes a terminal device that may support mobile communication such as a smart phone, a tablet computer, a vehicle-mounted terminal and an intelligent appliance. The terminal is configured with a first communication card and a second communication card. The first communication card and the second communication card include a subscriber identity module (SIM), a universal subscriber identity module (USIM), etc. The first communication card and the second communication card may be same or different, which are not limited in the disclosure.

In some embodiments of the disclosure, the terminal may be configured with two or more communication cards, and the first communication card and the second communication card may be any two communication cards among the two or more communication cards.

In embodiments of the disclosure, the first number of RF channels indicates a number of RF channels required by a service requested by the first communication card after starting the service based on a real-time network resource configuration, and the second number of RF channels indicates a number of RF channels requested by the service requested by the second communication card after starting the service based on the real-time network resource configuration.

At step 102, in a first preset situation, a third number of RF channels and a fourth number of RF channels are determined based on the first number of RF channels and the second number of RF channels.

The first preset situation includes: a sum of the first number of RF channels and the second number of RF channels being greater than a maximum number of RF channels supported by the terminal, and the first communication card or the second communication card being not in a first service state.

A sum of the third number of RF channels and the fourth number of RF channels is less than or equal to the maximum number of RF channels supported by the terminal.

It should be noted that, when registering the first communication card and the second communication card, it is required to report a capability of the terminal including a number of RF channels supported by the first communication card and a number of RF channels supported by the second communication card. The number of RF channels supported by the first communication card and the number of RF channels supported by the second communication card which are reported by the terminal are not limited in embodiments of the disclosure. Therefore, when the first communication card and the second communication card request a number of RF channels, a sum of the number of RF channels requested by the first communication card and the number of RF channels requested by the second communication card may be greater than the maximum number of RF channels supported by the terminal.

In embodiments of the disclosure, when the sum of the first number of RF channels and the second number of RF channels is greater than the maximum number of RF channels supported by the terminal, it indicates that allocation of the RF channel resources of the first communication card and the second communication card by the terminal starts to be limited by the maximum number of RF channels supported by the terminal. In this case, RF channel resources are allocated based on RF channel resource requirements of the first communication card and the second communication card on the premise of ensuring that the number of RF channels used by the first communication card and the second communication card does not exceed a limitation of the maximum number of RF channels, which may fully utilize the RF channel resources, that is, the third number of RF channels and the fourth number of RF channels are determined based on the first number of RF channels and the second number of RF channels, and the sum of the third number of RF channels and the fourth number of RF channels determined is less than or equal to the maximum number of RF channels supported by the terminal.

In embodiments of the disclosure, the first service is a service with a higher priority level, and the RF channel resources of the first communication card and the second communication card are allocated when performing the service with the higher priority level, which may affect a normal operation of the service and reduce a service quality. Therefore, it is required to ensure that the method is performed when the first communication card or the second communication card is not in the first service state.

For example, for a voice service such as a voice call, having a small end-to-end delay, the voice service is generally mapped to the higher priority level in order to satisfy the delay and a delay jitter indicator of the voice service, thus allocating the RF channel resources of the first communication card and the second communication card during the voice call may affect the call quality, resulting in a call interruption. For a short message service such as E-mail receiving, requirements for the delay and the jitter are low, allocating the RF channel resources of the first communication card and the second communication card during the voice call may hardly affects the service quality.

At step 103, a first capability and a second capability are reported to a first network device and a second network device, respectively.

The first capability indicates that a number of RF channels supported by the first communication card is the third number of RF channels, and the second capability indicates that a number of RF channels supported by the second communication card is the fourth number of RF channels.

In embodiments of the disclosure, the first network device is a network device registered by the first communication card, and the second network device is a network device registered by the second communication card. In an embodiment of the disclosure, the first network device and the second network device may be the same network device or may be different network devices. In an embodiment of the disclosure, the first network device and the second network device may be different devices of different operators or may be different devices of the same operator.

In embodiments of the disclosure, when registering the first communication card and the second communication card, the terminal reports capabilities. In the first preset situation, it is triggered to re-report the capabilities of the terminal. The terminal reports the first capability and the second capability to the first network device and the second network device, respectively. The first capability indicates that the number of RF channels supported by the first communication card is the third number of RF channels, and the second capability indicates that the number of RF channels supported by the second communication card is the fourth number of RF channels. The third number of RF channels and the fourth number of RF channels are allocated based on requirements of the first communication card and the second communication card for the RF channel resources. After the capabilities of the terminal are re-reported, the first communication card and the second communication card may request the required RF channel resources based on the third number of RF channels and the fourth number of RF channels, so that the RF channel resources of the terminal are fully utilized.

In summary, according to the method for communication control in the disclosure, the first number of RF channels requested by the first communication card and the second number of RF channels requested by the second communication card are determined; in the first preset situation, the third number of RF channels and the fourth number of RF channels are determined based on the first number of RF channels and the second number of RF channels, and the first capability and the second capability are reported to the first network device and the second network device, respectively. Therefore, a RF channel resource of each communication card is adjusted based on service RF channel requirements of two communication cards on the premise of ensuring that the number of RF channels used by the two communication cards does not exceed the maximum number of RF channels, which may fully utilize the RF channel resources, and improve service performances and user experiences.

Figure 2:
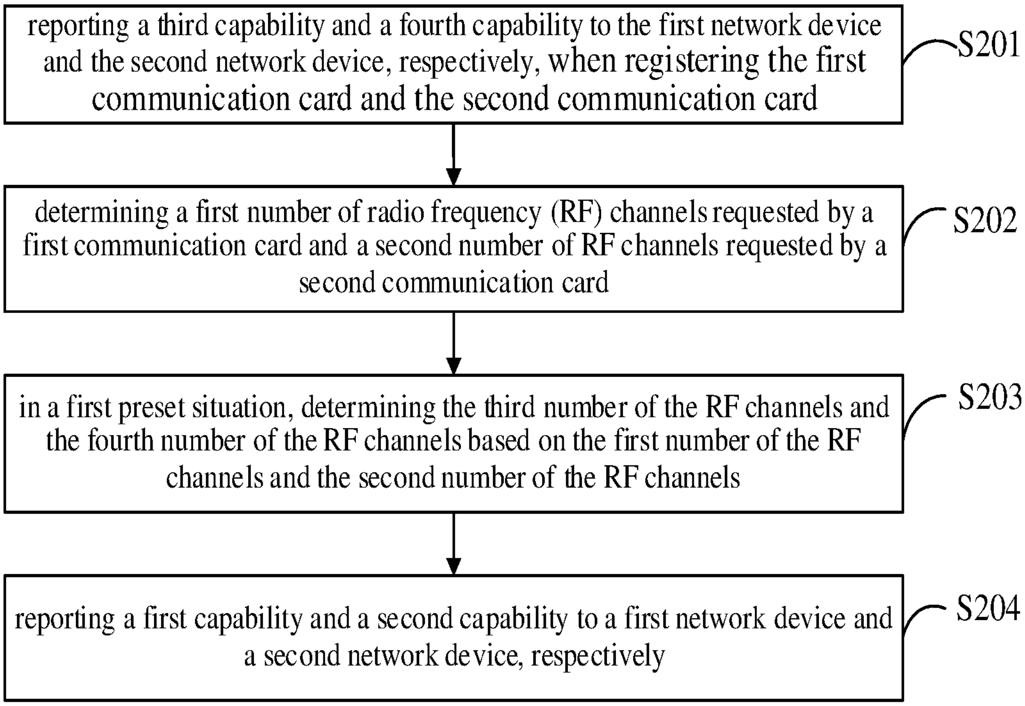
FIG. 2 is a flowchart illustrating a method for communication control according to embodiments of the present disclosure.

Based on embodiments as illustrated in FIG. 1, FIG. 2 further illustrates a flowchart of a method for communication control provided in the disclosure. The terminal is configured with a first communication card and a second communication card.

As illustrated in FIG. 2, the method for communication control may include steps 201 to 204.

At step 201, the third capability and the fourth capability are reported to the first network device and the second network device, respectively, when registering the first communication card and the second communication card.

The third capability indicates a fifth number of RF channels supported by the first communication card, the fourth capability indicates a sixth number of RF channels supported by the second communication card, and a sum of the fifth number of RF channels and the sixth number of RF channels can be greater than the maximum number of RF channels supported by the terminal.

In embodiments of the disclosure, the fifth number of RF channels is a number of RF channels supported by the first communication card which is reported when the first communication card is powered on and registered, and/or the fifth number of RF channels is a number of RF channels supported by the second communication card which is reported when the second communication card is powered on and registered.

It should be noted that the two communication cards configured by the terminal generally share one set of terminal hardware resources, to multiplex a maximum capability of a single card, that is, the maximum capability of the single card indicates that the maximum number of RF channels supported by a single communication card may be a maximum number of RF channels supported by the terminal. However, since there is only one set of terminal hardware resources, the number of RF channels occupied by the first communication card and the second communication card at the same time cannot exceed the maximum number of RF channels supported by the terminal.

In some embodiments of the disclosure, reporting the third capability and the fourth capability to the first network device and the second network device, respectively, when registering the first communication card and the second communication card, includes: determining a basic number of RF channels, in which the basic number of RF channels is configured to ensure that the first communication card and the second communication card can be in a service state simultaneously; determining a maximum number of RF channels supported by the first communication card and a maximum number of RF channels supported by the second communication card based on the basic number of RF channels and the maximum number of RF channels supported by the terminal; reporting the third capability when registering the first communication card to the first network device, in which the third capability indicates the fifth number of RF channels supported by the first communication card, the fifth number of RF channels is less than or equal to the maximum number of RF channels supported by the first communication card; and reporting the fourth capability when registering the second communication card to the second network device, in which the fourth capability indicates the sixth number of RF channels supported by the second communication card, the sixth number of RF channels is less than or equal to the maximum number of RF channels supported by the second communication card.

Specifically, the first communication card and the second communication card are respectively powered on and registered, and perform reporting of the capabilities of the terminal. The first communication card and the second communication card may report a maximum capability on the premise of ensuring allocation of a basic RF channel connected to the first communication card and the second communication card simultaneously, and the number of RF channels supported by the first communication card and the number of RF channels supported by the second communication card both reported may be greater than the maximum number of RF channels supported by the terminal.

For example, assuming that the maximum number of RF channels supported by the terminal is 5, and the number of the basic RF channel is determined as 1, the maximum number of RF channels supported by the first communication card may be reported to be 4, and the maximum number of RF channels supported by the second communication card may be reported to be 4. The third capability is reported when the first communication card is registered to the first network device, and the third capability indicates that the fifth number of RF channels supported by the first communication card is less than or equal to 4, such as 2. The fourth capability is reported when the second communication card is registered to the second network device, and the fourth capability indicates that the sixth number of RF channels supported by the second communication card is less than or equal to 4, such as 4. As such, the sum of the fifth RF channels and the sixth RF channels is greater than 5.

At step 202, a first number of radio frequency (RF) channels requested by a first communication card and a second number of RF channels requested by a second communication card are determined.

At step 203, in a first preset situation, the third number of RF channels and the fourth number of RF channels are determined based on the first number of RF channels and the second number of RF channels.

A sum of the third number of RF channels and the fourth number of RF channels determined is less than or equal to a maximum number of RF channels supported by the terminal. The first preset situation includes: a sum of the first number of RF channels and the second number of RF channels being greater than the maximum number of RF channels supported by the terminal, and the first communication card or the second communication card not triggering a first service.

At step 204, a first capability and a second capability are reported to a first network device and a second network device, respectively.

The first capability indicates that a number of RF channels supported by the first communication card is the third number of RF channels, and the second capability indicates that a number of RF channels supported by the second communication card is the fourth number of RF channels.

Descriptions of steps 202 to 204 may refer to steps 101 to 103 of the above embodiments as illustrated in FIG. 1, which will not be repeated here.

In summary, according to the method for communication control in the disclosure, when registering the first communication card and the second communication card, the third capability and the fourth capability are reported to the first network device and the second network device, respectively. The first number of RF channels requested by the first communication card and the second number of RF channels requested by the second communication card are determined. In the first preset situation, the third number of RF channels and the fourth number of RF channels are determined based on the first number of RF channels and the second number of RF channels, and the first capability and the second capability are reported to the first network device and the second network device, respectively. Therefore, the maximum number of RF channels supported by the first communication card and the second communication card may be reported on the premise of ensuring allocation of the basic RF channel connected to the first communication card and the second communication card simultaneously, which may fully utilize the RF channel resources.

Figure 3:
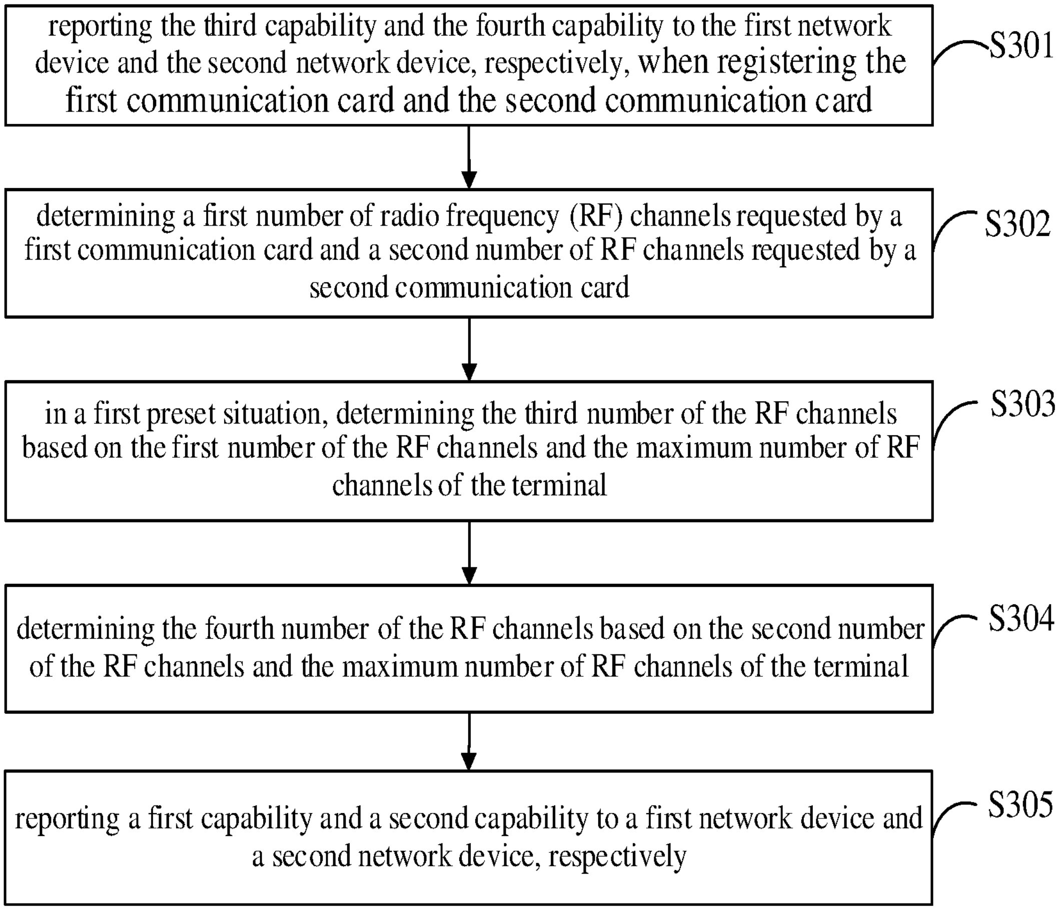
FIG. 3 is a flowchart illustrating a method for communication control according to embodiments of the present disclosure.

Based on embodiments as illustrated in FIG. 2, FIG. 3 further illustrates a flowchart of a method for communication control provided in the disclosure. The terminal is configured with a first communication card and a second communication card. As illustrated in FIG. 3, the method for communication control may include steps 301 to 305.

At step 301, when registering the first communication card and the second communication card, the third capability and the fourth capability are reported to the first network device and the second network device, respectively.

The first capability indicates a fifth number of RF channels supported by the first communication card, the second capability indicates a sixth number of RF channels supported by the second communication card, and a sum of the fifth number of RF channels and the sixth number of RF channels can be greater than the maximum number of RF channels supported by the terminal.

In some embodiments of the disclosure, reporting the third capability and the fourth capability to the first network device and the second network device, respectively, when registering the first communication card and the second communication card, includes: determining a basic number of RF channels, in which the basic number of RF channels is configured to ensure that the first communication card and the second communication card can be in a service state simultaneously; determining a maximum number of RF channels supported by the first communication card and a maximum number of RF channels supported by the second communication card based on the basic number of RF channels and the maximum number of the RF channels supported by the terminal; reporting the third capability when registering the first communication card to the first network device, in which the third capability indicates the fifth number of RF channels supported by the first communication card, in which the fifth number of RF channels is less than or equal to the maximum number of RF channels supported by the first communication card; and reporting the fourth capability when registering the second communication card to the second network device, in which the fourth capability indicates the sixth number of RF channels supported by the second communication card, the sixth number of RF channels is less than or equal to the maximum number of RF channels supported by the second communication card.

Descriptions of the above embodiments may refer to step 201 of the above embodiments as illustrated in FIG. 2, which will not be repeated here.

At step 302, a first number of radio frequency (RF) channels requested by a first communication card and a second number of RF channels requested by a second communication card are determined.

In some embodiments of the disclosure, determining the first number of radio frequency (RF) channels requested by the first communication card and the second number of RF channels requested by the second communication card includes: in response to the first communication card being in a service state, determining the first number of RF channels to be a number of RF channels requested by the first communication card via an RF channel resource management module, in which the first number of RF channels is less than or equal to the fifth number of RF channels; and in response to the second communication card being in the service state, determining the second number of RF channels to be a number of RF channels requested by the second communication card via the RF channel resource management module, in which the second number of RF channels is less than or equal to the sixth number of RF channels.

Specifically, the first communication card starts service, and requests required RF channel resources via a RF channel resource management module based on a real-time network resource configuration. A number of RF channels that can be requested by the first communication card does not exceed a first number of RF channels reported during registration.

Similarly, when the first communication card and the second communication card are powered on and registered respectively, the second communication card starts service, and requests required RF channel resources via the RF channel resource management module based on the real-time network resource configuration. A number of RF channels that can be requested by the second communication card does not exceed a second number of RF channels reported during registration.

At step 303, in a first preset situation, the third number of RF channels is determined based on the first number of RF channels and the maximum number of RF channels of the terminal.

The first preset situation includes: a sum of the first number of RF channels and the second number of RF channels being greater than the maximum number of RF channels supported by the terminal, and the first communication card or the second communication card being not in a first service state.

The third number of RF channels is less than or equal to the maximum number of RF channels supported by the first communication card.

At step 304, the fourth number of RF channels is determined based on the second number of RF channels and the maximum number of RF channels of the terminal.

The fourth number of RF channels is less than or equal to the maximum number of RF channels supported by the second communication card and the sum of the third number of RF channels and the fourth number of RF channels is less than or equal to the maximum number of RF channels supported by terminal.

In embodiments of the disclosure, when allocation of the basic RF channel that may be connected to the first communication card and the second communication card simultaneously for a service purpose is ensured firstly, RF channel resources are allocated based on requirements for the RF channel resources when the first communication card and the second communication card are in the service state, and the RF channels occupied by the first communication card and the second communication card are ensured not to exceed the maximum number of RF channels supported by the terminal, which may fully and properly allocate the RF channel resources.

In an implementation, the number of RF channels supported by the terminal is represented as M, the first number of RF channels is represented as N1, the second number of RF channels is represented as N2, and the basic number of RF channels is represented as K.

The third number of RF channels is as close to $M*N1/(N1+N2)$ as possible when being less than or equal to M-K, and the fourth number of RF channels is as close to $M*N2/(N1+N2)$ as possible when being less than M-K.

For example, assuming that the maximum number of RF channels supported by the terminal is 5, the number of RF channels supported which is reported by the first communication card and the second communication card during registration are both 4, the basic number of RF channels determined is 1. If the first communication card (a corresponding first number of RF channels is 2) starts the service, and the second communication card (a corresponding second number of RF channels is 4) starts the service, it can be obtained that the third number of RF channels is 2, and the fourth number of RF channels is 3 based on the above allocation mode.

At step 305, a first capability and a second capability are reported to a first network device and a second network device, respectively.

The first capability indicates that a number of RF channels supported by the first communication card is the third number of RF channels, and the second capability indicates that a number of RF channels supported by the second communication card is the fourth number of RF channels.

In some embodiments of the disclosure, the first preset situation further includes: within a preset time, a number of RF channels occupied by the first communication card being less than the fifth number of RF channels and a number of RF channels occupied by the second communication card being equal to the sixth number of RF channels, or the number of RF channels occupied by the first communication card being equal to the fifth number of RF channels and the number of RF channels occupied by the second communication card being less than the sixth number of RF channels.

For example, when the first service of the first communication card and the first service of the second communication card end, the RF channel resource management module of the terminal identifies that the number of RF channels supported by the first communication card is 1 within a period of time, however, the number of RF channels required which is requested by the first communication card to the RF channel resource management module is 3, and the terminal identifies that the number of RF channels supported by the second communication card is 4, however the number of RF channels required which is requested by the second communication card to the RF channel resource management module is 2. Therefore, the RF channel resources cannot be fully utilized, and reporting of the capabilities of the terminal may be re-triggered. According to steps 301 to 305, assuming that the basic number of RF channels determined is 1, the number of RF channels supported by the first communication card may be reported as 3, and the number of RF channels supported by the second communication card may be reported as 2.

It may be understood that the RF channel resource management module may obtain the RF channel resources required by the first communication card and the second communication card in real time, and further dynamically adjust the RF channel resource of each communication card based on RF channel requirements of the first communication card and the second communication card, to properly allocate the RF channel resources of the terminal.

In some embodiments of the disclosure, the method further includes: in a second preset situation, re-reporting the third capability and the fourth capability to the first network device and the second network device, respectively. The second preset situation includes the first communication card is not in a service state or the second communication card is not in the service state.

According to the above steps, when the first network device and the second network device start the service, the RF channel resource of each communication card are adjusted based on service RF channel requirements of the first communication card and the second communication card, and the sum of the number of the RF channels supported by the first communication card and the number of the RF channels supported by the second communication card can be ensured not to exceed the maximum number of RF channels supported by the terminal.

Further, when the first communication card or the second communication card ends service, the RF channel resources do not need to be allocated based on the service RF channel requirements of the first communication card and the second communication card, and may be re-reported based on the maximum capability supported by the first communication card and the second communication card. The number of RF channels supported by the first communication card and the second communication card may exceed the maximum number of RF channels supported by the terminal, specifically referring to step 201 as illustrated in embodiments of FIG. 2. Therefore, fully utilization of the RF channel resources is achieved on the premise of ensuring allocation of the basic RF channel connected to the first communication card and the second communication card simultaneously.

In summary, according to the method for communication control in the disclosure, maximum capabilities supported by the two communication cards may be reported on the premise of ensuring the basic RF channel allocation connected to the two communication cards simultaneously, and when the number of RF channels used by the two communication cards does not exceed the maximum number of RF channels supported by the terminal, the communication cards may use more RF channel resources, and when the number of RF channels used by the two communication cards exceeds the maximum number of RF channels supported by the terminal, the RF communication resource of each communication card is adjusted based on the service RF channel requirements of the two communication cards. Thus the RF channel resources are fully utilized while ensuring that the number of RF channels used by the two communication cards does not exceed the maximum number of RF channels supported by the terminal, and the service performances and the user experiences are improved.

Figure 4:
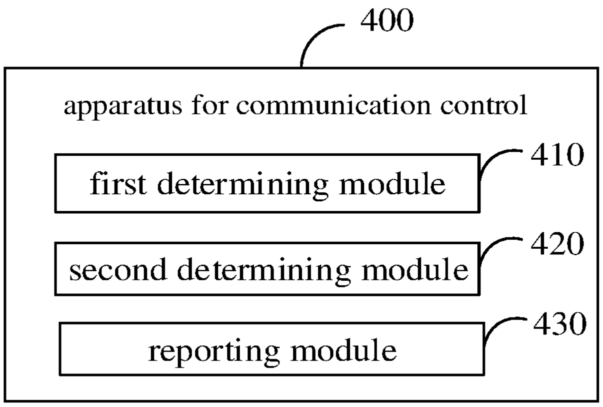
FIG. 4 is a diagram illustrating a structure of an apparatus for communication control according to embodiments of the present disclosure.

FIG. 4 is a diagram illustrating a structure of an apparatus 400 for communication control according to embodiments of the present disclosure. As illustrated in FIG. 4, the apparatus for communication control includes a first determining module 410, a second determining module 420 and a reporting module 430.

The first determining module 410 is configured to determine a first number of radio frequency (RF) channels requested by a first communication card and a second number of RF channels requested by a second communication card.

The second determining module 420 is configured to, in a first preset situation, determine a third number of RF channels and a fourth number of RF channels based on the first number of RF channels and the second number of RF channels. A sum of the third number of RF channels and the fourth number of RF channels is less than or equal to a maximum number of RF channels supported by a terminal. The first preset situation includes: a sum of the first number of RF channels and the second number of RF channels being greater than the maximum number of RF channels supported by the terminal, and the first communication card or the second communication card being not in a first service state.

The reporting module 430 is configured to report a first capability and a second capability to a first network device and a second network device, respectively. The first capability indicates that a number of RF channels supported by the first communication card is the third number of RF channels. The second capability indicates that a number of RF channels supported by the second communication card is the fourth number of RF channels.

In some embodiments of the disclosure, the reporting module 430 is further configured to report a third capability and a fourth capability to the first network device and the second network device, respectively, when registering the first communication card and the second communication card. The third capability indicates a fifth number of RF channels supported by the first communication card. The fourth capability indicates a sixth number of RF channels supported by the second communication card. A sum of the fifth number of RF channels and the sixth number of RF channels can be greater than the maximum number of RF channels supported by the terminal.

In some embodiments of the disclosure, reporting the third capability and the fourth capability to the first network device and the second network device, respectively, when registering the first communication card and the second communication card, includes: determining a basic number of RF channels, in which the basic number of RF channels is configured to ensure that the first communication card and the second communication card can be in a service state simultaneously; determining a maximum number of RF channels supported by the first communication card and a maximum number of RF channels supported by the second communication card based on the basic number of RF channels and the maximum number of the RF channels supported by the terminal; reporting the third capability when registering the first communication card to the first network device, in which the third capability indicates the fifth number of RF channels supported by the first communication card, the fifth number of RF channels is less than or equal to the maximum number of RF channels supported by the first communication card; and reporting the fourth capability when registering the second communication card to the second network device, in which the fourth capability indicates the sixth number of RF channels supported by the second communication card, the sixth number of RF channels is less than or equal to the maximum number of RF channels supported by the second communication card.

In some embodiments of the disclosure, the first determining module 410 is specifically configured to, in response to the first communication card being in a service state, determine the first number of RF channels to be a number of RF channels requested by the first communication card via an RF channel resource management module. The first number of RF channels is less than or equal to the fifth number of RF channels. In response to the second communication card being in the service state, it is determined the second number of RF channels to be a number of RF channels requested by the second communication card via the RF channel resource management module. The second number of RF channels is less than or equal to the sixth number of RF channels.

In some embodiments of the disclosure, the second determining module 420 is specifically configured to determine the third number of RF channels based on the first number of RF channels and the maximum number of RF channels of the terminal, in which the third number of RF channels is less than or equal to the maximum number of RF channels supported by the first communication card; and determine the fourth number of RF channels based on the second number of RF channels and the maximum number of RF channels of the terminal, in which the fourth number of RF channels is less than or equal to the maximum number of RF channels supported by the second communication card and the sum of the third number of RF channels and the fourth number of RF channels is less than or equal to the maximum number of RF channels supported by the terminal.

In some embodiments of the disclosure, the first preset situation further includes: within a preset time, a number of RF channels occupied by the first communication card being less than the fifth number of RF channels and a number of RF channels occupied by the second communication card being equal to the sixth number of RF channels, or the number of RF channels occupied by the first communication card being equal to the fifth number of RF channels and the number of RF channels occupied by the second communication card being less than the sixth number of RF channels.

In some embodiments of the disclosure, the reporting module 430 is further configured to: in a second preset situation, re-report the third capability and the fourth capability to the first network device and the second network device, respectively. The second preset situation includes the first communication card is not in a service state or the second communication card is not in the service state.

Since the apparatus provided in embodiments of the present disclosure corresponds to the method provided in the above several embodiments, the implementation of the method is also applicable to the apparatus provided in the embodiment, which will not be described in the embodiment.

In summary, in the apparatus for communication control, the apparatus is configured in the terminal, with the first determining module, the second determining module and the reporting module, the RF channel resource of each communication card is adjusted based on service RF channel requirements of two communication cards on the premise of ensuring that the number of RF channels used by the two communication cards does not exceed the maximum number of RF channels supported by the terminal, which may fully utilize the RF channel resources, and improve service performances and user experiences.

In embodiments provided in the disclosure, the method and the apparatus provided in embodiments of the present disclosure are introduced. To achieve various functions in the methods provided in embodiments of the disclosure, the electronic device may include a hardware structure and a software module, to achieve the above functions in the form of the hardware structure, the software module or a combination of the hardware structure and the software module. A certain function in the above functions may be performed by the hardware structure, the software module or a combination of the hardware structure and the software module.

Figure 5:
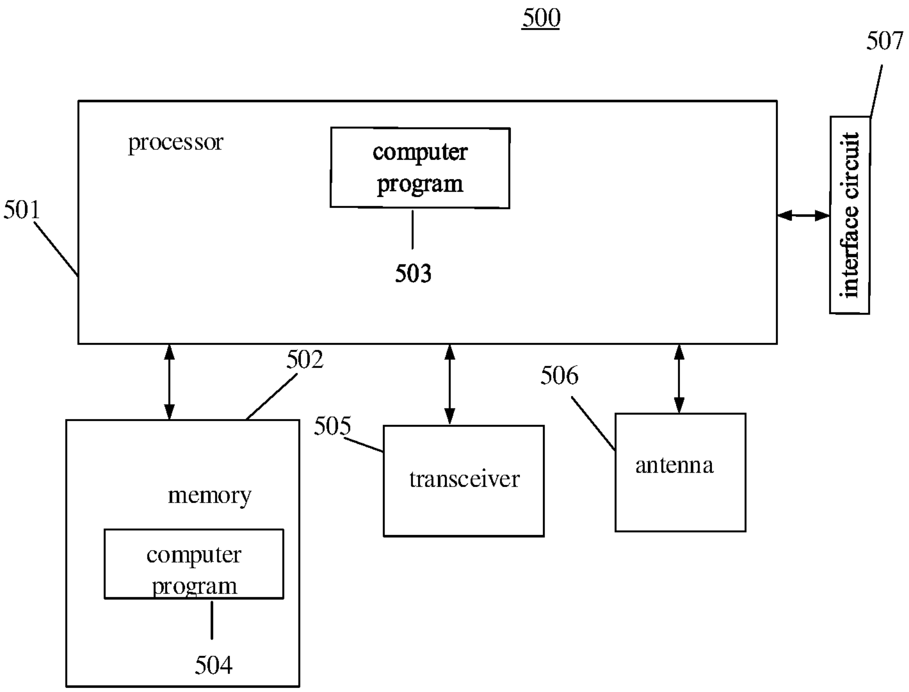
FIG. 5 is a diagram illustrating a structure of a communication device according to embodiments of the present disclosure.

Referring to FIG. 5, FIG. 5 is a diagram illustrating a structure of communication device 500 according to embodiments of the present disclosure. The communication device 500 may be a network device, a user equipment, a chip, a system on chip or a processor that supports the network device to implement the method, or a chip, a system on chip or a processor that supports the user equipment to implement the method. The device may be configured to implement the method described in the method embodiments, and may refer to descriptions in the method embodiments.

The communication device 500 may include one or more processors 501. The processor 501 may include a general purpose processor or a dedicated processor. For example, the processor 141 may be a baseband processor or a central processor. The baseband processor may be configured to process a communication protocol and communication data, and the central processor may be configured to control a communication device (e.g., a base station, a baseband chip, a terminal device, a terminal device chip, a DU or CU, etc.), to execute a computer program, and process data of the computer program.

Optionally, the communication device 500 may further include one or more memories 502 with a computer program 504 stored thereon. The processor 501 executes the computer program 504 so that the communication device 500 performs the method as described in the above method embodiments. Optionally, the memory 502 may further store data. The communication device 500 and the memory 502 may be independently configured or integrated together.

Optionally, the communication device 500 may further include a transceiver 505 and an antenna 506. The transceiver 505 may be referred to as a transceiving unit, a transceiver or a transceiving circuit, which may be configured to achieve a transceiving function. The transceiver 505 may include a receiver and a transmitter. The receiver may be referred to as a receiver or a receiving circuit, etc., for implementing a receiving function; the transmitter may be referred to as a transmitter or a transmission circuit, etc. for implementing a transmission function.

Optionally, the communication device 500 may further include one or more interface circuits 507. The interface circuit 507 is configured to receive code instructions and transmit the code instructions to the processor 501. The processor 501 runs code instructions so that the communication device 500 performs the method as described in the above method embodiments.

In an implementation, the processor 501 may include a transceiver configured to implement receiving and transmitting functions. For example, the transceiver may be a transceiving circuit, or an interface, or an interface circuit. The transceiving circuit, the interface or the interface circuit configured to implement receiving and transmitting functions may be separate or integrated together. The transceiving circuit, the interface or the interface circuit may be configured to read and write codes/data, or the transceiving circuit, the interface or the interface circuit may be configured to transmit or deliver a signal.

In an implementation, the processor 501 may be stored with a computer program 503. The computer program 503 runs on the processor 501 so that the communication device 500 performs the method as described in the above method embodiments. The computer program 503 may be solidified in the processor 501, in which case the processor 501 may be implemented by a hardware.

In an implementation, the communication device 500 may include a circuit that may implement a transmitting or receiving or communication function in the above method embodiments. The processor and the transceiver described in the disclosure may be implemented on integrated circuits (ICs), analog ICs, radio frequency integrated circuits (RFICs), mixed signal ICs, application specific integrated circuits (ASICs), printed circuit boards (PCBs), electronic devices, etc. The processor and the transceiver may further be fabricated by using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe) and gallium arsenide (GaAs).

The communication device described in the above embodiments may be a network device or a user equipment, but the scope of the communication device described in the present disclosure is not limited thereto, and a structure of the communication device may be not subject to FIG. 5. The communication device may be a stand-alone device or may be a part of a larger device. For example, the communication device may be:

(1) a stand-alone integrated circuit (IC), or a chip, or a system on chip or a subsystem;
(2) a set of one or more ICs, optionally, which may also include a storage component for storing data and a computer program;
(3) an ASIC, such as a Modem;
(4) a module that may be embedded within other devices;
(5) a receiver, a terminal device, a smart terminal device, a cellular phone, a wireless device, a handset, a mobile unit, a vehicle device, a network device, a cloud device, an artificial intelligence device, etc.; and
(6) others, and so forth.

Figure 6:
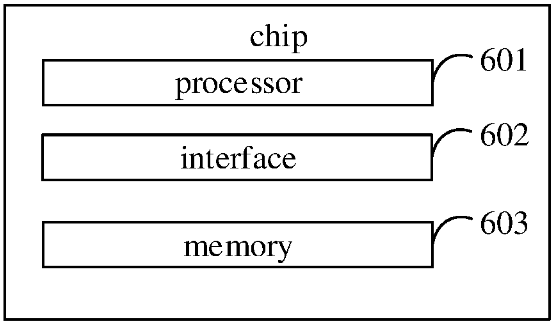
FIG. 6 is a diagram illustrating a structure of a chip according to embodiments of the present disclosure.

In the case that the communication device may be a chip or a system on chip, please refer to a diagram of a structure of a chip as illustrated in FIG. 6. FIG. 6 is a diagram illustrating a structure of a chip according to embodiments of the present disclosure. The chip as illustrated in FIG. 6 includes a processor 601 and an interface 602. There may be one or more processors 601, and there may be a plurality of interfaces 602. The processor is configured to run code instructions to perform the method for communication control as described in the above embodiments.

Optionally, the chip further includes a memory 603. The memory 603 is configured to save a necessary computer program and data.

Those skilled in the related art may understand that various illustrative logical blocks and steps listed in embodiments of the present disclosure, may be implemented by electronic hardware, computer software or a combination of electronic hardware and computer software. Whether the function is implemented by hardware or software depends on specific applications and design requirements for an overall system. Those skilled in the art may implement the functions by using various methods for each specific application, but such an implementation should not be understood as beyond the scope of protection of embodiments of the present disclosure.

A non-transitory computer-readable storage medium storing computer instructions is provided according to embodiments of the present disclosure. The computer instructions are configured to perform the method for communication control in the above embodiments of the present disclosure by a computer.

A computer program product is further provided according to embodiments of the present disclosure, and includes a computer program. The computer program is configured to implement the method for communication control as described in above embodiments when executed by a processor.

A communication system is provided according to embodiments of the disclosure, and includes a terminal, a first network device and a second network device. The terminal is configured to perform the method for communication control as described in embodiments of the first aspect.

In the above embodiments, the functions may be wholly or partially implemented by software, hardware, firmware, or any combination thereof. When implemented by software, the functions may be implemented in whole or in part in the form of a computer program product. The computer program product includes one or more computer programs. Processes or functions according to embodiments of the present disclosure are wholly or partially generated when the computer program is loaded and executed on a computer. The computer may be a general purpose computer, a special purpose computer, a computer network, or other programmable device. The computer program may be stored in a computer-readable storage medium or transmitted from one computer-readable storage medium to another. For example, the computer program may be transmitted from one website, computer, server, or data center to another via wire (such as a coaxial cable, a fiber optic, a digital subscriber line (DSL)) or wireless (such as infrared, wireless, microwave). The computer-readable storage medium may be any available medium that may be accessed by a computer or a data storage device such as a server that integrates one or more of the available media, and a data center. The readable medium may be a magnetic medium (such as a floppy disk, a hard disk and a magnetic tape), an optical medium (such as a digital video disk (DVD)), or a semiconductor medium (such as a solid state disk (SSD)).

Those skilled in the art may understand that various numbers, such as first and second, involved in describing the disclosure are distinguished merely for convenience of description, and are not intended to limit the scope of embodiments of the disclosure, but also to indicate an order of precedence.

The term at least one in describing the present disclosure may denote one or more, and more may be two, three, four or more, which is not limited in the present disclosure. In embodiments of the disclosure, for a kind of technical feature, technical features in the kind of technical feature are distinguished by "first", "second", "third", "A", "B", "C" and "D", and there is no order of precedence or magnitude between technical features described in "first", "second", "third", "A", "B", "C" and "D".

As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and the internet.

The computer system may include a client and a server. The client and the server are generally far away from each other and generally interact with each other through a communication network. The relation between the client and the server is generated by computer programs that run on the corresponding computer and have a client-server relationship with each other.

It should be understood that various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

In addition, embodiments of the disclosure may be independently implemented, or may be implemented with other embodiments when the solution is achieved.

Those skilled in the related art may realize that units and algorithm steps of the examples described in embodiments of the present disclosure may be implemented by electronic hardware or a combination of electronic hardware and computer software. Whether the functions are executed by the hardware or the software depends on a specific application and a design constraint of the technical solution. Those skilled in the art may adopt different methods for each specific application to implement the described functions, but such implementation should not be considered beyond the scope of the present disclosure.

Those skilled in the art may clearly understand that a specific working process of a system, an apparatus and a unit described above may refer to a corresponding process in the above method embodiments, which will not be repeated here.

The above are only implementations of the disclosure. However, the scope of protection of the disclosure is not limited here. Variations or substitutions that may be easily considered by those skilled in the art shall be contained within the scope of protection of the present disclosure. Therefore, the scope of protection of the present disclosure shall subject to the scope of protection of the appended claims.

The invention claimed is:

1. A method for communication control, comprising:

determining a first number of radio frequency (RF) channels requested by a first communication card and a second number of RF channels requested by a second communication card;

in a first preset situation, determining a third number of RF channels and a fourth number of RF channels based on the first number of RF channels and the second number of RF channels, wherein a sum of the third number of RF channels and the fourth number of RF channels is less than or equal to a maximum number of RF channels supported by a terminal, the first preset situation comprises: a sum of the first number of RF channels and the second number of RF channels being greater than the maximum number of RF channels supported by the terminal, and the first communication card or the second communication card being not in a first service state; and reporting a first capability and a second capability to a first network device and a second network device, respectively, wherein the first capability indicates that a number of RF channels supported by the first communication card is the third number of RF channels, and the second capability indicates that a number of RF channels supported by the second communication card is the fourth number of RF channels;

before determining the first number of radio frequency (RF) channels requested by the first communication card and the second number of RF channels requested by the second communication card, the method comprising:

reporting a third capability and a fourth capability to the first network device and the second network device, respectively, when registering the first communication card and the second communication card, wherein the third capability indicates a fifth number of RF channels supported by the first communication card, the fourth capability indicates a sixth number of RF channels supported by the second communication card, and a sum of the fifth number of RF channels and the sixth number of RF channels is greater than the maximum number of RF channels supported by the terminal.

2. The method according to claim 1, wherein reporting the third capability and the fourth capability to the first network device and the second network device, respectively, when registering the first communication card and the second communication card, comprises:

determining a basic number of RF channels, wherein the basic number of RF channels is configured to ensure that the first communication card and the second communication card are in a service state simultaneously;

determining a maximum number of RF channels supported by the first communication card and a maximum number of RF channels supported by the second communication card based on the basic number of RF channels and the maximum number of RF channels supported by the terminal;

reporting the third capability when registering the first communication card to the first network device, wherein the third capability indicates the fifth number of RF channels supported by the first communication card, wherein the fifth number of RF channels is less than or equal to the maximum number of RF channels supported by the first communication card; and reporting the fourth capability when registering the second communication card to the second network device, wherein the fourth capability indicates the sixth number of RF channels supported by the second communication card, the sixth number of RF channels is less than or equal to the maximum number of RF channels supported by the second communication card.

3. The method according to claim 1, wherein determining the first number of RF channels requested by the first communication card and the second number of RF channels requested by the second communication card comprises:

in response to the first communication card being in a service state, determining the first number of RF channels to be a number of RF channels requested by the first communication card via an RF channel resource management module, wherein the first number of RF channels is less than or equal to the fifth number of RF channels; and in response to the second communication card being in the service state, determining the second number of RF channels to be a number of RF channels requested by the second communication card via the RF channel resource management module, wherein the second number of RF channels is less than or equal to the sixth number of RF channels.

4. The method according to claim 1, wherein determining the third number of RF channels and the fourth number of RF channels based on the first number of RF channels and the second number of RF channels comprises:

determining the third number of RF channels based on the first number of RF channels and the maximum number of RF channels of the terminal, wherein the third number of RF channels is less than or equal to the maximum number of RF channels supported by the first communication card; and determining the fourth number of RF channels based on the second number of RF channels and the maximum number of RF channels of the terminal, wherein the fourth number of RF channels is less than or equal to the maximum number of RF channels supported by the second communication card, and the sum of the third number of RF channels and the fourth number of RF channels is less than or equal to the maximum number of RF channels supported by the terminal.

5. The method according to claim 1, wherein the first preset situation further comprises:

within a preset time, a number of RF channels occupied by the first communication card being less than the fifth number of RF channels and a number of RF channels occupied by the second communication card being equal to the sixth number of RF channels, or the number of RF channels occupied by the first communication card being equal to the fifth number of RF channels and the number of RF channels occupied by the second communication card being less than the sixth number of RF channels.

6. The method according to claim 1, further comprising:

in a second preset situation, re-reporting the third capability and the fourth capability to the first network device and the second network device, respectively, wherein the second preset situation comprises the first communication card being not in a service state or the second communication card being not in the service state.

7. A communication device, comprising:

a transceiver;

a memory; and a processor respectively connected to the transceiver and the memory, configured to:

determine a first number of radio frequency (RF) channels requested by a first communication card and a second number of RF channels requested by a second communication card;

in a first preset situation, determine a third number of RF channels and a fourth number of RF channels based on the first number of RF channels and the second number of RF channels, wherein a sum of the third number of RF channels and the fourth number of RF channels is less than or equal to a maximum number of RF channels supported by a terminal, the first preset situation comprises: a sum of the first number of RF channels and the second number of RF channels being greater than the maximum number of RF channels supported by the terminal, and the first communication card or the second communication card being not in a first service state; and report a first capability and a second capability to a first network device and a second network device, respectively, wherein the first capability indicates that a number of RF channels supported by the first communication card is the third number of RF channels, and the second capability indicates that a number of RF channels supported by the second communication card is the fourth number of RF channels;

before determining the first number of radio frequency (RF) channels requested by the first communication card and the second number of RF channels requested by the second communication card, report a third capability and a fourth capability to the first network device and the second network device, respectively, when registering the first communication card and the second communication card, wherein the third capability indicates a fifth number of RF channels supported by the first communication card, the fourth capability indicates a sixth number of RF channels supported by the second communication card, and a sum of the fifth number of RF channels and the sixth number of RF channels is greater than the maximum number of RF channels supported by the terminal.

8. The communication device according to claim 7, wherein the processor is configured to:

determine a basic number of RF channels, wherein the basic number of RF channels is configured to ensure that the first communication card and the second communication card are in a service state simultaneously;

determine a maximum number of RF channels supported by the first communication card and a maximum number of RF channels supported by the second communication card based on the basic number of RF channels and the maximum number of RF channels supported by the terminal;

report the third capability when registering the first communication card to the first network device, wherein the third capability indicates the fifth number of RF channels supported by the first communication card, wherein the fifth number of RF channels is less than or equal to the maximum number of RF channels supported by the first communication card; and report the fourth capability when registering the second communication card to the second network device, wherein the fourth capability indicates the sixth number of RF channels supported by the second communication card, the sixth number of RF channels is less than or equal to the maximum number of RF channels supported by the second communication card.

9. The communication device according to claim 7, wherein the processor is configured to:

in response to the first communication card being in a service state, determine the first number of RF channels to be a number of RF channels requested by the first communication card via an RF channel resource management module, wherein the first number of RF channels is less than or equal to the fifth number of RF channels; and in response to the second communication card being in the service state, determine the second number of RF channels to be a number of RF channels requested by the second communication card via the RF channel resource management module, wherein the second number of RF channels is less than or equal to the sixth number of RF channels.

10. The communication device according to claim 7, wherein the processor is configured to:

determine the third number of RF channels based on the first number of RF channels and the maximum number of RF channels of the terminal, wherein the third number of RF channels is less than or equal to the maximum number of RF channels supported by the first communication card; and determine the fourth number of RF channels based on the second number of RF channels and the maximum number of RF channels of the terminal, wherein the fourth number of RF channels is less than or equal to the maximum number of RF channels supported by the second communication card, and the sum of the third number of RF channels and the fourth number of RF channels is less than or equal to the maximum number of RF channels supported by the terminal.

11. The communication device according to claim 7, wherein the first preset situation further comprises:

within a preset time, a number of RF channels occupied by the first communication card being less than the fifth number of RF channels and a number of RF channels occupied by the second communication card being equal to the sixth number of RF channels, or the number of RF channels occupied by the first communication card being equal to the fifth number of RF channels and the number of RF channels occupied by the second communication card being less than the sixth number of RF channels.

12. The communication device according to claim 7, wherein the processor is configured to:

in a second preset situation, re-report the third capability and the fourth capability to the first network device and the second network device, respectively, wherein the second preset situation comprises the first communication card being not in a service state or the second communication card being not in the service state.

13. A computer-readable storage medium storing computer executable instructions, wherein the computer executable instructions are caused to implement a method when executed by a processor, and the method comprises:

determining a first number of radio frequency (RF) channels requested by a first communication card and a second number of RF channels requested by a second communication card;

in a first preset situation, determining a third number of RF channels and a fourth number of RF channels based on the first number of RF channels and the second number of RF channels, wherein a sum of the third number of RF channels and the fourth number of RF channels is less than or equal to a maximum number of RF channels supported by a terminal, the first preset situation comprises: a sum of the first number of RF channels and the second number of RF channels being greater than the maximum number of RF channels supported by the terminal, and the first communication card or the second communication card being not in a first service state; and reporting a first capability and a second capability to a first network device and a second network device, respectively, wherein the first capability indicates that a number of RF channels supported by the first communication card is the third number of RF channels, and the second capability indicates that a number of RF channels supported by the second communication card is the fourth number of RF channels;

before determining the first number of radio frequency (RF) channels requested by the first communication card and the second number of RF channels requested by the second communication card, the method comprising:

reporting a third capability and a fourth capability to the first network device and the second network device, respectively, when registering the first communication card and the second communication card, wherein the third capability indicates a fifth number of RF channels supported by the first communication card, the fourth capability indicates a sixth number of RF channels supported by the second communication card, and a sum of the fifth number of RF channels and the sixth number of RF channels is greater than the maximum number of RF channels supported by the terminal.

14. The storage medium according to claim 13, wherein reporting the third capability and the fourth capability to the first network device and the second network device, respectively, when registering the first communication card and the second communication card, comprises:

determining a basic number of RF channels, wherein the basic number of RF channels is configured to ensure that the first communication card and the second communication card are in a service state simultaneously;

determining a maximum number of RF channels supported by the first communication card and a maximum number of RF channels supported by the second communication card based on the basic number of RF channels and the maximum number of RF channels supported by the terminal;

reporting the third capability when registering the first communication card to the first network device, wherein the third capability indicates the fifth number of RF channels supported by the first communication card, wherein the fifth number of RF channels is less than or equal to the maximum number of RF channels supported by the first communication card; and reporting the fourth capability when registering the second communication card to the second network device, wherein the fourth capability indicates the sixth number of RF channels supported by the second communication card, the sixth number of RF channels is less than or equal to the maximum number of RF channels supported by the second communication card.

15. The storage medium according to claim 13, wherein determining the first number of RF channels requested by the first communication card and the second number of RF channels requested by the second communication card comprises:

in response to the first communication card being in a service state, determining the first number of RF channels to be a number of RF channels requested by the first communication card via an RF channel resource management module, wherein the first number of RF channels is less than or equal to the fifth number of RF channels; and in response to the second communication card being in the service state, determining the second number of RF channels to be a number of RF channels requested by the second communication card via the RF channel resource management module, wherein the second number of RF channels is less than or equal to the sixth number of RF channels.

16. The storage medium according to claim 13, wherein determining the third number of RF channels and the fourth number of RF channels based on the first number of RF channels and the second number of RF channels comprises:

determining the third number of RF channels based on the first number of RF channels and the maximum number of RF channels of the terminal, wherein the third number of RF channels is less than or equal to the maximum number of RF channels supported by the first communication card; and determining the fourth number of RF channels based on the second number of RF channels and the maximum number of RF channels of the terminal, wherein the fourth number of RF channels is less than or equal to the maximum number of RF channels supported by the second communication card, and the sum of the third number of RF channels and the fourth number of RF channels is less than or equal to the maximum number of RF channels supported by the terminal.

17. The storage medium according to claim 13, wherein the method further comprises:

in a second preset situation, re-reporting the third capability and the fourth capability to the first network device and the second network device, respectively, wherein the second preset situation comprises the first communication card being not in a service state or the second communication card being not in the service state.

* * * * *